(12) United States Patent
Tada et al.

(10) Patent No.: US 10,610,990 B2
(45) Date of Patent: Apr. 7, 2020

(54) MACHINE TOOL AND CONTROL METHOD OF MACHINE TOOL

(71) Applicant: Toshiba Kikai Kabushiki Kaisha, Chiyoda-ku, Tokyo (JP)

(72) Inventors: Atsushi Tada, Gotemba (JP); Takuma Miyamoto, Gotemba (JP)

(73) Assignee: Toshiba Kikai Kabushiki Kaisha, Tokyo (JP)

( * ) Notice: Subject to any disclaimer, the term of this patent is extended or adjusted under 35 U.S.C. 154(b) by 310 days.

(21) Appl. No.: 15/830,888

(22) Filed: Dec. 4, 2017

(65) Prior Publication Data
US 2018/0154489 A1 Jun. 7, 2018

(30) Foreign Application Priority Data

Dec. 7, 2016 (JP) .................. 2016-237921
Jul. 11, 2017 (JP) .................. 2017-135234

(51) Int. Cl.
| | |
|---|---|
| B23Q 3/10 | (2006.01) |
| B23Q 3/00 | (2006.01) |
| F16C 32/06 | (2006.01) |
| B23Q 1/38 | (2006.01) |
| F16C 29/02 | (2006.01) |

(Continued)

(52) U.S. Cl.
CPC .............. *B23Q 3/10* (2013.01); *B23Q 1/385* (2013.01); *B23Q 3/005* (2013.01); *F16C 29/025* (2013.01); *F16C 32/0648* (2013.01); *F16C 32/0659* (2013.01); *G05B 19/401* (2013.01); *G05B 19/4183* (2013.01); *F16C 2322/00* (2013.01); *F16C 2322/39* (2013.01); *G05B 2219/34318* (2013.01); *G05B 2219/37357* (2013.01);

(Continued)

(58) Field of Classification Search
CPC ... B23Q 1/00; B23Q 1/01; B23Q 1/03; B23Q 1/25; B23Q 1/28; B23Q 3/00; B23Q 3/06; B23P 11/00; B23P 19/00; B23P 19/04
See application file for complete search history.

(56) References Cited

U.S. PATENT DOCUMENTS

| | | | |
|---|---|---|---|
| 2,869,933 | A | 1/1959 | Bissinger |
| 4,648,725 | A | 3/1987 | Takahashi |

(Continued)

FOREIGN PATENT DOCUMENTS

| | | |
|---|---|---|
| CN | 1075355 | 2/1992 |
| CN | 103770364 | 5/2014 |

(Continued)

OTHER PUBLICATIONS

Chinese Office Action in CN application No. 201711143211 dated Mar. 21, 2019.

(Continued)

*Primary Examiner* — Lee D Wilson
(74) *Attorney, Agent, or Firm* — DLA Piper LLP US

(57) ABSTRACT

A control system of a machine tool includes a hydraulic pressure adjuster. The hydraulic pressure adjuster includes a sequence program controller that includes components for adding a function of adjusting a hydrostatic pressure of a static pressure oil supplied to a hydrostatic pressure guide mechanism, which are a pressure setting unit, a constant acceleration motion controller, a workpiece-weight calculator and a supply state adjuster.

6 Claims, 10 Drawing Sheets

(51) Int. Cl.
  *G05B 19/418* (2006.01)
  *G05B 19/401* (2006.01)
(52) U.S. Cl.
  CPC .............. *G05B 2219/39523* (2013.01); *G05B 2219/43099* (2013.01)

(56) References Cited

U.S. PATENT DOCUMENTS

| | | | |
|---|---|---|---|
| 6,367,788 B1 * | 4/2002 | Babchuk | B23K 37/0443 269/45 |
| 6,779,787 B2 * | 8/2004 | Gryder | B23Q 1/032 269/289 R |
| 8,505,894 B2 * | 8/2013 | Takahashi | B23Q 1/66 269/55 |
| 9,700,976 B2 * | 7/2017 | Gao | B23Q 1/621 |
| 2014/0112603 A1 | 4/2014 | Chen et al. | |
| 2016/0115993 A1 | 4/2016 | Tada et al. | |
| 2016/0115994 A1 | 4/2016 | Tada et al. | |
| 2018/0154489 A1 * | 6/2018 | Tada | B23Q 1/385 |

FOREIGN PATENT DOCUMENTS

| | | |
|---|---|---|
| CN | 105537970 | 5/2016 |
| CN | 105537981 | 5/2016 |
| JP | S60-256621 | 12/1985 |
| JP | S61-63028 | 4/1986 |
| JP | H07-305724 | 11/1995 |
| JP | 2004-058192 | 2/2004 |
| JP | 2008-238397 | 10/2008 |
| JP | 2016-083763 | 5/2016 |

OTHER PUBLICATIONS

Abstract of CN 1075355, published Feb. 12, 1992.
English Language Abstract of JP 2004-058192 published Feb. 26, 2004.
English Language Abstract of JP 2008-238397 published Oct. 9, 2008.
English Language Abstract of JP 2016-083763 published May 19, 2016.

* cited by examiner

MACHINE TOOL AND CONTROL METHOD OF MACHINE TOOL

The entire disclosure of Japanese Patent Application No. 2016-237921 filed on Dec. 7, 2016 and Japanese Patent Application No. 2017-135234 filed on Jul. 11, 2017 is expressly incorporated by reference herein.

TECHNICAL FIELD

The present invention relates to a machine tool including a hydrostatic pressure guide mechanism and a control method of a machine tool.

BACKGROUND ART

Typically, various movement mechanisms are used in a machine tool in order to move a workpiece (an object to be machined) and a tool for machining the workpiece to desired relative positions.

For instance, linear movement mechanisms are provided in X-axis, Y-axis and Z-axis to a support structure of a table on which the workpiece is placed or a support structure of a head to which the tool is attached in order to move the workpiece and/or the tool in three dimensions. Moreover, a rotary movement mechanism is used for changing a posture of the table and/or the head.

Each of the movement mechanisms includes: two relatively movable members (e.g., a guide member and a movement member movable along the guide member); a driving mechanism for moving the two members; and a guide mechanism for securing an accuracy (guiding accuracy) of a moving direction or a movement axis.

Such a guide mechanism is required to have a high guiding accuracy, namely, a geometrical accuracy showing that a linear movement is conducted in a line as straight as possible and a rotational movement is conducted in a circle as perfect as possible. Further, the guide mechanism is required to have a high load capacity, a low friction and a high damping performance.

Specifically, the guiding accuracy of the guide mechanism affects a positioning accuracy of the two relatively movable members and, consequently, affects a profile accuracy of a workpiece to be machined. The low friction of the guide mechanism affects the positioning accuracy along a movement axis and, consequently, affects the profile accuracy of the workpiece to be machined. Moreover, the damping performance affects damping of vibration between the two relatively movable members. Specifically, a damping level of the vibration generating between the tool and the workpiece affects a machined surface roughness of the workpiece.

A hydrostatic pressure guide mechanism may be used in the guide mechanism of the machine tool (see, for instance, Patent Literature 1: JP 2004-58192 A).

In a typical hydrostatic pressure guide mechanism as disclosed in Patent Literature 1, a static pressure chamber (i.e., a concave portion into which an oil for supporting a static pressure load is supplied) is formed on one of a pair of slide surfaces. A static pressure oil is supplied into the static pressure chamber, and a load is transmitted to the other of the slide surfaces by the static pressure. In other words, only the static pressure oil intervenes between the pair of slide surfaces, so that the pair of slide surfaces are in non-contact with each other with a significantly reduced slide resistance.

The above hydrostatic pressure guide mechanism, which lets an oil film constantly intervene between the pair of slide surfaces irrespective of whether the mechanism is still or in motion, can endure a high load and reliably reduce friction.

However, since the hydrostatic pressure guide mechanism is configured to float an object using the oil film, a damping performance of the hydrostatic pressure guide mechanism is limitative. Moreover, the hydrostatic pressure guide mechanism requires a supply device for supplying the static pressure oil for forming the oil film and a recovery device for recovering the static pressure oil. Especially, a typical hydrostatic pressure guide mechanism using a static pressure oil cannot discharge the oil into the outer air unlike an air static pressure bearing using air. Accordingly, the static pressure oil supplied to a static pressure chamber is discharged from an outer periphery to the outside of the guide mechanism. In particular, the hydrostatic pressure guide mechanism, which discharges a huge amount of the static pressure oil as compared with a sliding guide, requires the recovery device for recovering the static pressure oil and returning the static pressure oil to the supply device. Accordingly, the arrangements of devices and pipes associated with the guide mechanism inevitably become complicated.

By the way, a traditional sliding guide mechanism (dynamic pressure guide mechanism) is still often used as a guide mechanism for a machine tool (Patent Literature 2: JP 2008-238397 A).

The sliding guide mechanism has a pair of smooth slide surfaces, one of which is attached with a less-slide member. The slide surfaces are slid while a lubricating oil is supplied therebetween. The pair of slide surfaces are lubricated with the lubricating oil via the less-slide member.

The above sliding guide mechanism, which enables a sliding guide on the basis of a solid-solid contact between the pair of slide surfaces, exhibits improved guiding accuracy and damping performance while being structurally simplified. However, the sliding guide mechanism has a small load capacity and a large friction coefficient, which is particularly increased when the sliding guide mechanism is started and/or driven at a low speed, and thus occasionally fails to smoothly move to affect a positioning accuracy.

In order to smooth the motion of the machine tool, a hydrostatic pressure guide mechanism excellent in terms of low friction may be used as the guide mechanism in place of the typical sliding guide mechanism.

However, even if the typical sliding guide mechanism is simply replaced by the hydrostatic pressure guide mechanism, a desired performance is unlikely to be obtained because of the above-described difference in characteristics.

Accordingly, a hydrostatic-pressure combined sliding guide mechanism, which uses a combination of a typical sliding guide mechanism and a hydrostatic pressure guide mechanism, is suggested (Patent Literature 3: JP 2016-083763 A).

Specifically, a single guide mechanism includes a combination of a sliding guide mechanism and a hydrostatic pressure guide mechanism, allowing for high guiding accuracy and damping performance (i.e., the characteristics of a dynamic pressure guide mechanism) and a high-load endurance (i.e., the characteristics of a hydrostatic pressure guide mechanism).

In such a hydrostatic-pressure combined sliding guide mechanism, the sliding guide mechanism basically receives a load and determines a guiding accuracy and the hydrostatic pressure guide mechanism supplementally receives the load using a supply pressure of a static pressure oil supplied to a static pressure chamber, thereby increasing an allowable load as a whole.

The above arrangement, however, cannot provide the advantages of the combined use, when the hydrostatic pressure guide mechanism fails to be supplied with a sufficient supply pressure of the static pressure oil and thus the load is not supplementally received with the static pressure oil as desired.

In contrast, an excessive supply of the supply pressure to the hydrostatic pressure guide mechanism causes a rise of a portion receiving the hydrostatic pressure, which results in a gap between the pair of slide surfaces of the sliding guide mechanism. The contact between the slide surfaces of the sliding guide mechanism thus becomes insufficient, lowering the guiding accuracy. Further, malfunction and/or damage or the like may be caused.

Accordingly, the supply state of the static pressure oil needs to be suitably adjusted depending on the load received by the guide mechanism. Specifically, for instance, the supply pressure of the static pressure oil should be increased in case of application of a high load and be reduced in case of application of a low load.

For instance, a load acting on the machine tool is basically attributed to a weight of a workpiece to be machined. Accordingly, the weight of the workpiece may be measured in advance to set the supply pressure of the static pressure oil in a control system.

However, in such a case, the workpiece weight needs to be measured in advance. Further, since the weight of the workpiece may be changed with the progress of machining, the adjustment of the supply pressure is unlikely to be always suitable.

Accordingly, a control method of a hydrostatic pressure guide mechanism allowing for estimating a workpiece weight on a driving mechanism side and suitably adjusting the supply of a static pressure oil has been demanded.

SUMMARY OF THE INVENTION

An object of the invention is to provide a machine tool and a control method of a machine tool that allow for suitably adjusting a supply pressure of a static pressure oil supplied to a hydrostatic pressure guide mechanism depending on a workpiece weight.

According to an aspect of the invention, a machine tool includes: a guide member; a movement member configured to move with respect to the guide member; a driving mechanism configured to move the movement member; a hydrostatic pressure guide mechanism provided between a guide surface of the guide member and a smooth surface of the movement member; and a control system configured to control a supply state of a static pressure oil supplied to the hydrostatic pressure guide mechanism, the control system including: a setting unit configured to set a supply pressure of the static pressure oil supplied to the hydrostatic pressure guide mechanism at a predetermined pressure; a constant acceleration motion unit configured to cause a constant acceleration motion of the movement member, on which a workpiece is placed, with respect to the guide member by the driving mechanism; a workpiece-weight estimation unit configured to estimate a weight of the workpiece from an operation state of the driving mechanism during the constant acceleration motion; and a supply state adjusting unit configured to adjust the supply state of the static pressure oil controlled by the control system depending on the weight of the workpiece estimated by the workpiece-weight estimation unit.

In the above aspect of the invention, the constant acceleration motion unit causes the constant acceleration motion of the movement member, on which a workpiece is placed, with the driving mechanism, and the workpiece-weight estimation unit estimates the weight of the workpiece from the operation state of the driving mechanism at this time. The supply state adjusting unit can thus suitably adjust the supply pressure of the static pressure oil depending on the estimated weight irrespective of whether or not the weight of the workpiece is unknown. Further, as long as a machining program of the machine tool contains a weight-estimation process, the supply pressure of the static pressure oil can be automatically adjusted at a timing specified by the machining program. The supply pressure of the static pressure oil can thus be kept suitably adjusted irrespective of a change in the weight of the workpiece with the progress of machining.

In the above aspect, it is preferable that the constant acceleration motion of the movement member caused by the constant acceleration motion unit includes a cutting feed operation or a fast-forward operation performed when machining of the machine tool is not in progress.

In the above arrangement, the constant acceleration motion of the movement member is performed in a form of the cutting feed operation or the fast-forward operation of the machine tool, eliminating the necessity of a dedicated movement for the weight estimation and, consequently, improving a work efficiency.

In the above aspect, it is preferable that the control system further includes a supply pressure setting unit configured to determine the predetermined pressure, before the setting unit sets the supply pressure of the static pressure oil at the predetermined pressure, by: setting the supply pressure of the static pressure oil at a specific value; measuring an inertia mass or an inertia moment obtained when each of a plurality of workpieces having known weights is moved at a constant acceleration; plotting a measured inertia mass or a measured inertia moment obtained from a measurement result and a nominal inertia mass or a nominal inertia moment derived from the weight of the each of the workpieces; performing a process from the setting of the supply pressure of the static pressure oil to the plotting upon setting each of a plurality of different supply pressures; and selecting, as the predetermined pressure, one of the supply pressures resulting in the smallest and non-excessive deviation between the plotted measured inertia mass or measured inertia and the plotted nominal inertia mass or nominal inertia moment.

In detecting the operation state of the driving mechanism, the above arrangement allows for selecting and supplying the suitable pressure of the static pressure oil and, consequently, improving the accuracy of the weight estimation.

In the above aspect, it is preferable that the machine tool further includes a sliding guide mechanism provided between the guide surface of the guide member and the smooth surface of the movement member, the sliding guide mechanism providing a hydrostatic-pressure combined sliding guide mechanism in combination with the hydrostatic pressure guide mechanism.

Further, the sliding guide mechanism may surround the hydrostatic pressure guide mechanism between the guide surface of the guide member and the smooth surface of the movement member or, alternatively, the sliding guide mechanism may be adjacent to the hydrostatic pressure guide mechanism, as long as the sliding guide mechanism and the hydrostatic pressure guide mechanism function as a hydrostatic-pressure combined sliding guide mechanism.

In the above arrangement, a balance between a load applied on the hydrostatic pressure guide mechanism and a load applied on the sliding guide mechanism can be adjusted by adjusting the supply state of the static pressure oil depending on the weight of the workpiece. Specifically, when the workpiece applies a large load, the supply pressure of the static pressure oil is increased to preferentially ensure that the hydrostatic pressure guide mechanism can receive a high load, and when the weight of the workpiece is small, the supply pressure of the static pressure oil is reduced to allow the sliding guide mechanism to be more effective than the hydrostatic pressure guide mechanism, increasing the guiding accuracy and the damping performance. The performance of the guide mechanism can thus be varied depending on the weight of the workpiece.

In the above aspect, it is preferable that the hydrostatic pressure guide mechanism includes: a closed static pressure chamber that is sealed around an outer periphery thereof; a supply passage through which the static pressure oil is supplied to the static pressure chamber; and a recovery passage through which the static pressure oil is recovered from the static pressure chamber, and the hydrostatic pressure guide mechanism is connected to a hydraulic pressure adjusting device configured to adjust the static pressure oil supplied to the static pressure chamber.

In the above arrangement, the hydrostatic pressure guide mechanism uses a sealed hydrostatic pressure structure, so that the static pressure oil having been supplied to the static pressure chamber through the supply passage can be recovered through the recovery passage without leaking around. In case of using a typical hydrostatic pressure guide mechanism, an increase in the static pressure oil supplied to the static pressure chamber of the hydrostatic pressure guide mechanism may result in an increase in the leakage of the static pressure oil from static pressure chamber to the surroundings and in an adverse influence of the leaking static pressure oil on the sliding guide mechanism or the other surroundings. In contrast, the above arrangement can prevent the leakage of the static pressure oil to the surroundings and thus allow for increasing and reducing the static pressure oil supplied to the hydrostatic pressure guide mechanism without causing an adverse influence on the surroundings.

According to another aspect of the invention, a control method of a machine tool, the machine tool including: a guide member; a movement member configured to move with respect to the guide member; a driving mechanism configured to move the movement member; a hydrostatic pressure guide mechanism provided between a guide surface of the guide member and a smooth surface of the movement member; and a control system configured to control a supply state of a static pressure oil supplied to the hydrostatic pressure guide mechanism, the method including: placing a workpiece on the movement member; setting a supply pressure of the static pressure oil supplied to the hydrostatic pressure guide mechanism at a predetermined pressure; causing a constant acceleration motion of the movement member, on which a workpiece is placed, with respect to the guide member by the driving mechanism; estimating a weight of the workpiece from an operation state of the driving mechanism during the constant acceleration motion; and adjusting the supply state of the static pressure oil controlled by the control system depending on the estimated weight of the workpiece.

The above aspect of the invention is supposed to provide the same advantages as those of the above machine tool.

The above aspects of the invention can provide a machine tool and a control method of a machine tool that allow for suitably adjusting a supply pressure of a static pressure oil supplied to a hydrostatic pressure guide mechanism depending on a workpiece weight.

BRIEF DESCRIPTION OF DRAWING(S)

FIG. 1 is a perspective view showing a machine tool according to a first exemplary embodiment of the invention.

FIG. 2 a schematic view showing a guide mechanism of the machine tool according to the first exemplary embodiment.

FIG. 3 schematically shows an arrangement of the guide mechanism according to the first exemplary embodiment.

DESCRIPTION OF EMBODIMENT(S)

FIGS. 1 to 5 show a first exemplary embodiment of the invention.

First Exemplary Embodiment

Figure 1:
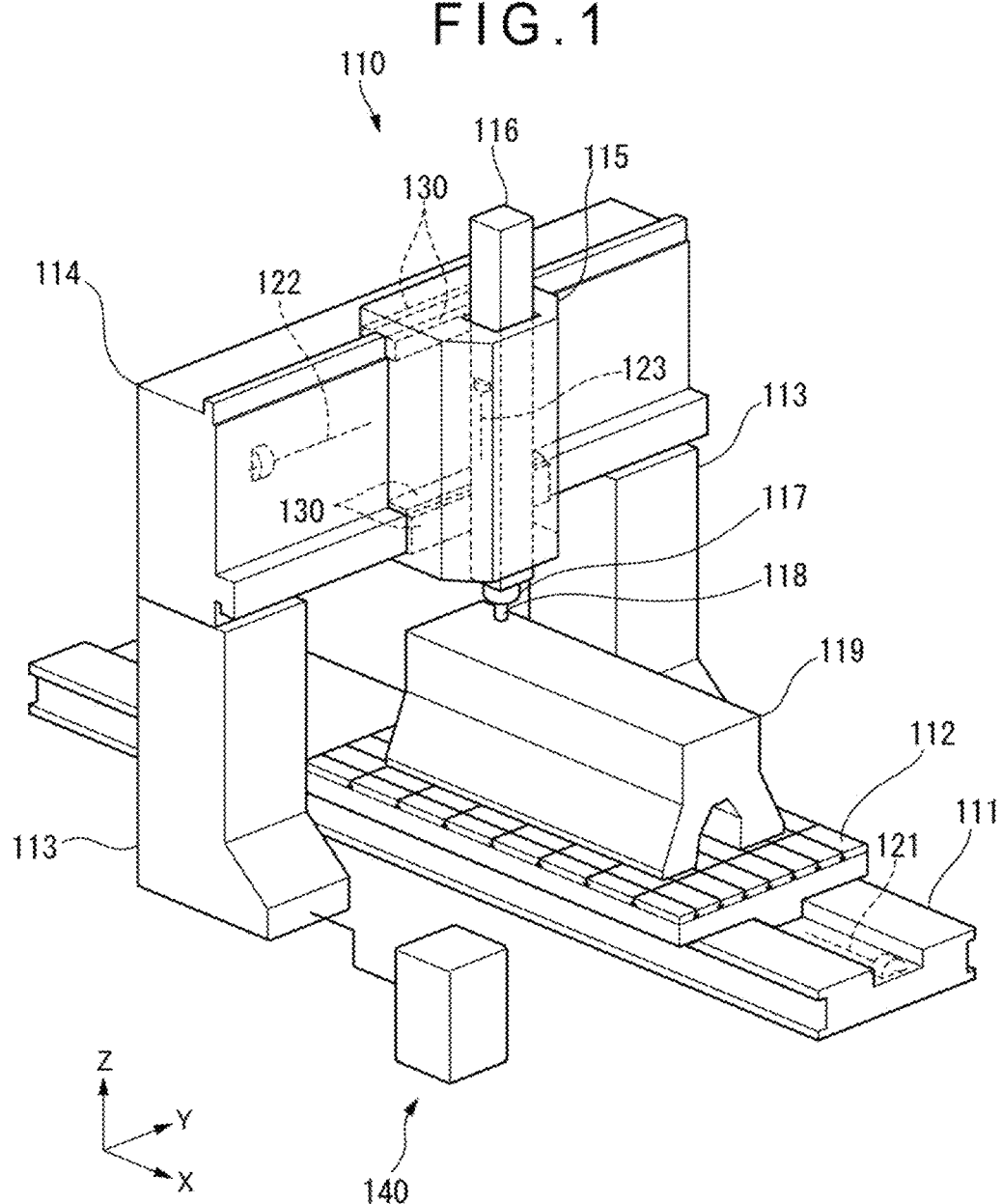

FIG. 1 shows a machine tool 110 with a portal structure according to the first exemplary embodiment. The machine tool 110 includes a guide mechanism 130 for each of X-axis, Y-axis and Z-axis movement mechanisms, and the guide mechanism 130 includes a hydrostatic pressure guide mechanism 1 and a sliding guide mechanism 10 (both described later).

As shown in FIG. 1, the machine tool 110 further includes a platform 111 extending in the X-axis direction and a table 112 supported by the platform 111. A pair of columns 113 are provided on both sides of the platform 111. A cross bar 114 extends in the Y-axis direction between upper ends of the columns 113. A head 115 is supported by the cross bar 114. A ram 116 extending in the Z-axis direction (vertical direction) is attached to the head 115.

A workpiece 119, which is an object to be machined, is fixed on a top surface of the table 112. A spindle 117 is exposed from a lower end of the ram 116. A machining tool 118 is attached to the spindle 117.

In the machine tool 110, the tool 118 can be moved in three dimensions relatively to the workpiece 119 by moving the table 112 in the X-axis direction, moving the head 115 in the Y-axis direction, and moving the ram 116 in the Z-axis direction. With this relative movement, the workpiece 119 can be machined into any shapes.

In order to machine the workpiece in three dimensions as described above, the machine tool 110 is provided with an X-axis movement mechanism 121 for moving the table 112 along the platform 111, a Y-axis movement mechanism 122 for moving the head 115 along the cross bar 114, and a Z-axis movement mechanism 123 for moving the ram 116 relative to the head 115.

Further, the machine tool 110 is connected to a control system 140.

The control system 140, which is a so-called NC system (numerical control system), is configured to control the machine tool 110 in accordance with a loaded operation program to perform a predetermined operation. For instance, the X-axis movement mechanism 121, the Y-axis movement mechanism 122 and the Z-axis movement mechanism 123 are individually moved in accordance with a command indicated by the operation program to three-dimensionally move the tool 118 and, further, the spindle 117 is controllably rotated, thereby controllably cutting the workpiece 119 with the tool 118 into a predetermined workpiece shape.

Further, the control system 140 also serves as a hydraulic pressure adjusting device according to the invention (described later in detail).

The X-axis movement mechanism 121, the Y-axis movement mechanism 122, and the Z-axis movement mechanism 123 each include: the guide mechanism 130 that supports a moving portion (e.g., the table 112 movable with respect to the platform 111) in a manner to allow the moving portion to be moved and is configured to guide the moving portion in a predetermined moving direction; and a driving mechanism 150 that is configured to drive the moving portion in accordance with an externally inputted command.

Figure 6:
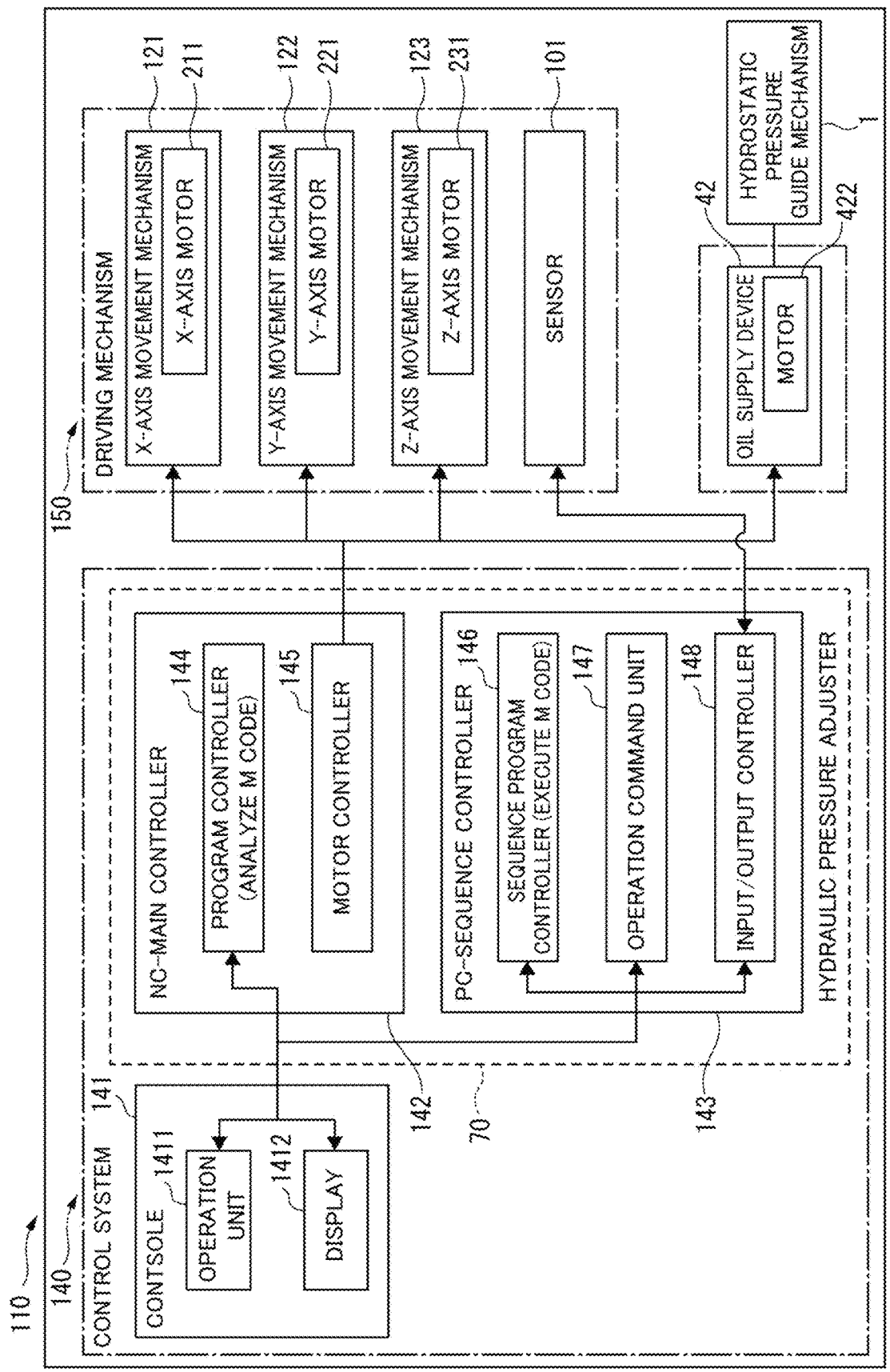
FIG. 6 is a block diagram showing a control system according to the first exemplary embodiment.
Figure 7:
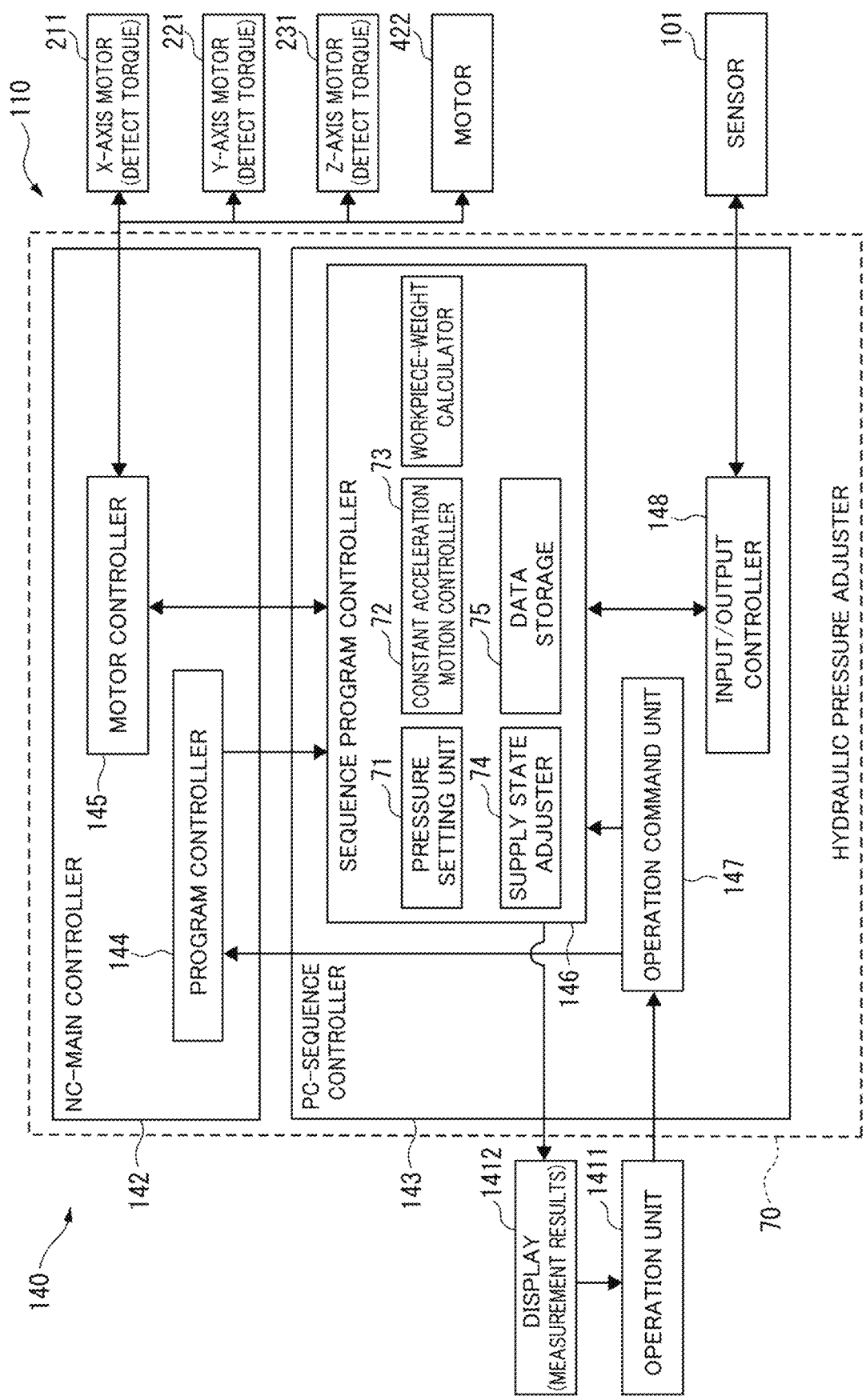
FIG. 7 is a block diagram showing a hydraulic pressure adjuster according to the first exemplary embodiment.

The driving mechanism 150, which is configured to drive the moving portion supported by the guide mechanism 130, includes drive motors for driving the axis movement mechanisms 121 to 123, such as an X-axis motor 211 for the X-axis movement mechanism 121, a Y-axis motor 221 for the Y-axis movement mechanism 122 and a Z-axis motor 231 for the Z-axis movement mechanism 123, as shown in FIGS. 6 and 7.

Guide Mechanism 130

Figure 2:
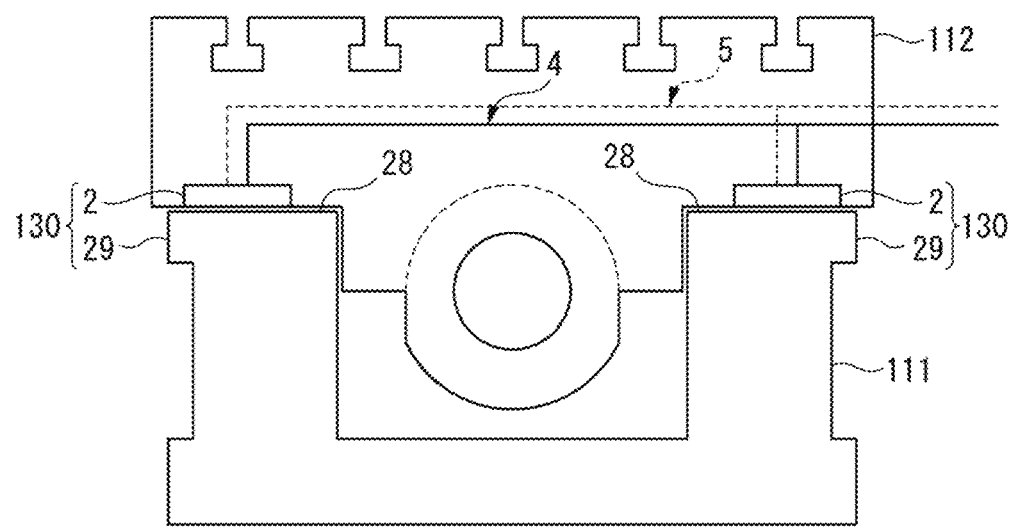
Figure 3:
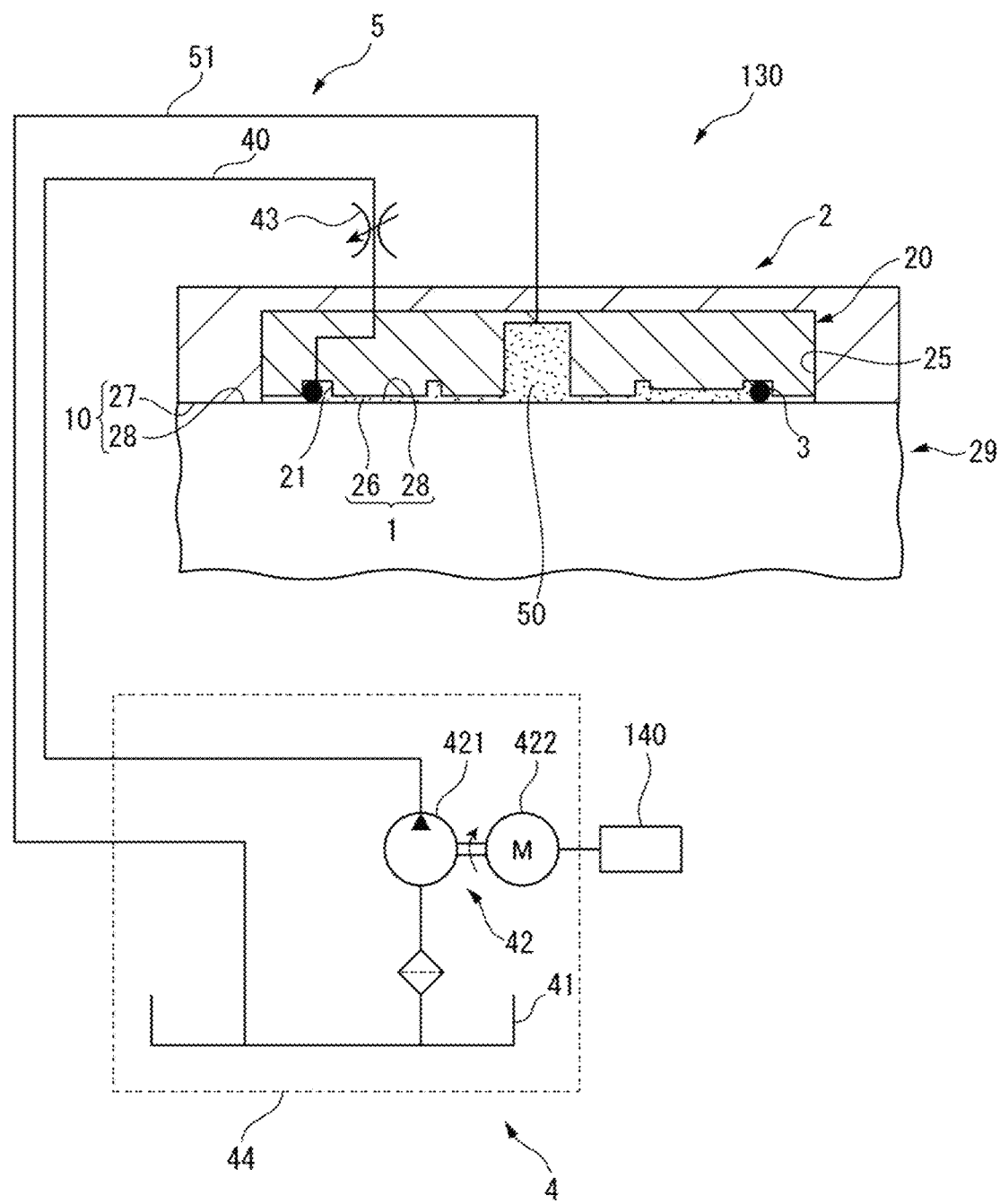
Figure 4:
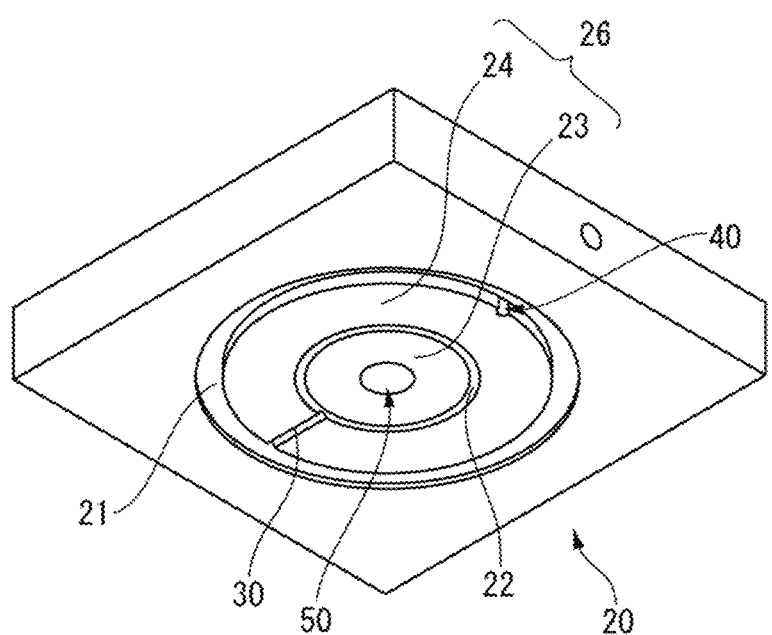
FIG. 4 is a perspective view showing a static pressure unit of a hydrostatic pressure guide mechanism according to the first exemplary embodiment.

As shown in FIGS. 2 to 4, the guide mechanism 130 includes a guide member 29 and a movement member 2 movable with respect to the guide member 29.

The movement member 2 is formed of a plate with a surface facing the guide member 29 and having a concave 25 located off a periphery thereof. A static pressure unit 20 is fitted in the concave 25 and a static pressure surface 26 of the static pressure unit 20 faces the guide member 29. In the first the first exemplary embodiment, a depth of the concave 25 is larger than a thickness of the static pressure unit 20, thereby preventing metal contact when no static pressure oil is supplied.

A surface of the guide member 29 facing the movement member 2 serves as a guide surface 28.

The movement member 2 and the guide member 29 are arranged such that the guide surface 28 faces the static pressure surface 26 of the static pressure unit 20, which is fitted in the concave 25 of the movement member 2, and a dynamic pressure surface 27.

In this arrangement, the hydrostatic pressure guide mechanism 1 is defined between the static pressure surface 26 and the guide surface 28, and the sliding guide mechanism 10 is defined between the dynamic pressure surface 27 and the guide surface 28.

In other words, the guide mechanism 130 is a hydrostatic-pressure combined sliding guide mechanism including the hydrostatic pressure guide mechanism 1 and the sliding guide mechanism 10.

It should be noted that the static pressure unit 20 may be undetachable and the hydrostatic pressure guide mechanism 1 may be directly incorporated in the movement member 2.

Sliding Guide Mechanism 10

Figure 5:
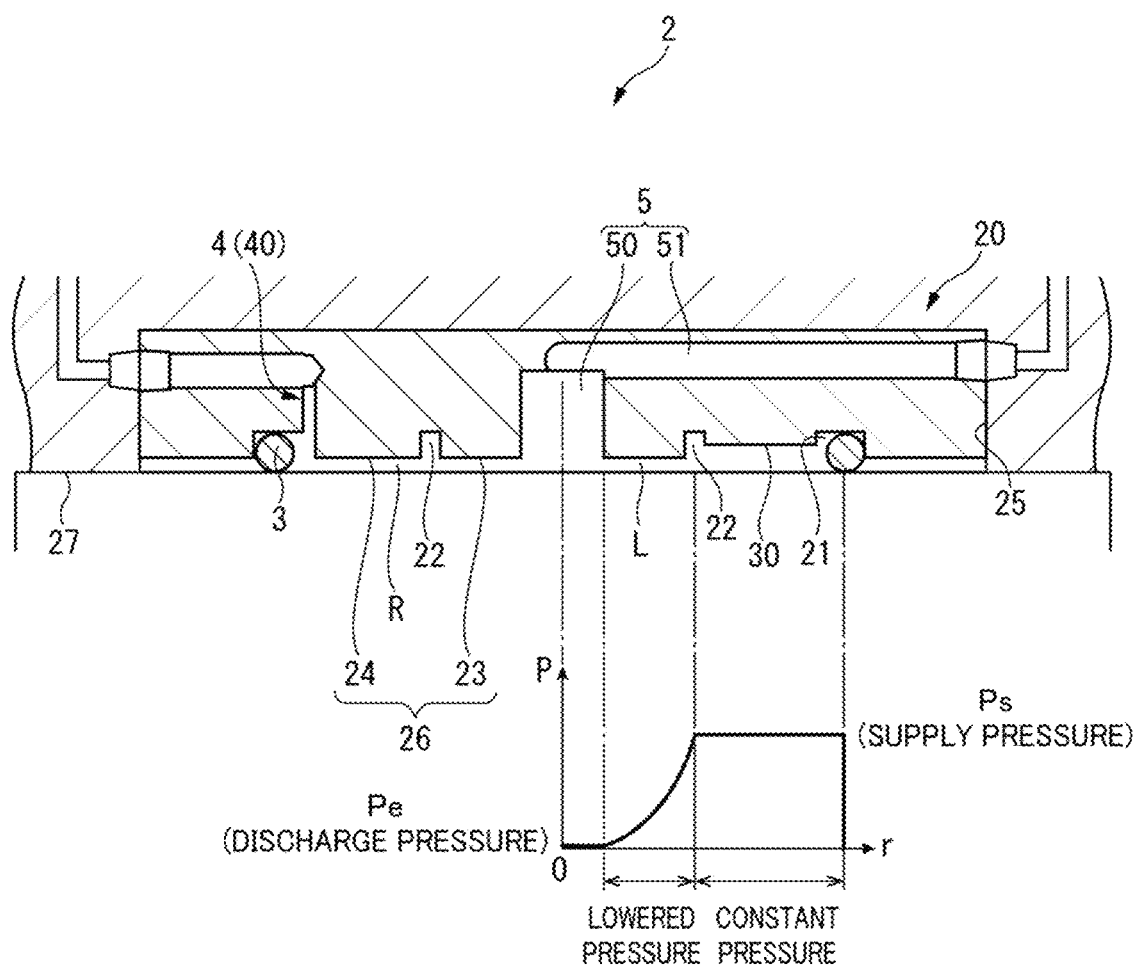
FIG. 5 is a vertically cross-sectional view showing a movement member of the hydrostatic pressure guide mechanism according to the first exemplary embodiment.

As shown in FIGS. 3 and 5, the sliding guide mechanism 10, in which the dynamic pressure surface 27 of the movement member 2 and the guide surface 28 of the guide member 29 are in contact with each other, supports a load applied by the movement member 2. The sliding guide mechanism 10 surrounds a periphery of the hydrostatic pressure guide mechanism 1 at this time.

Further, a sheet made of a low-friction material such as poly tetrafluoroethylene is continuously stuck all over the dynamic pressure surface 27 so that a relative sliding motion between the dynamic pressure surface 27 and the guide surface 28 allows for a movement of the movement member 2 with respect to the guide member 29.

Hydrostatic Pressure Guide Mechanism 1

As shown in FIGS. 3 to 5, the hydrostatic pressure guide mechanism 1 is configured to float and support a load applied by the movement member 2 using a static pressure of an externally supplied static pressure oil O having been pressurized. Accordingly, the hydrostatic pressure guide mechanism 1 is connected to an oil supply structure 4 and an oil recovery structure 5 for supplying and recovering the static pressure oil O.

As shown in FIGS. 4 and 5, the static pressure unit 20, which provides the hydrostatic pressure guide mechanism 1, has a lower surface provided with concentric outer groove 21 and inner groove 22 each formed of a concave. Inner flat surface 23 and outer flat surface 24, which provide the static pressure surface 26, are defined on the inside relative to the outer groove 21 and bordered by the inner groove 22. A middle of the inner flat surface 23A is provided with a recovery hole 50 of the oil recovery structure 5. A part of the outer flat surface 24 is provided with a communication groove 30 extending radially from the outer groove 21 to the inner groove 22. The outer groove 21 receives a ring-shaped seal member 3, such as an oil-proof rubber, and is in communication with an oil supply passage 40 of the oil supply structure 4 on the inside relative to the seal member 3 (i.e., near the static pressure portion R).

Further, on the inside relative to the seal member 3, a circular static pressure portion R (recess) is defined between the outer flat surface 24 and the guide surface 28, and a pressure-lowering portion L (land) is defined between the inner flat surface 23 and the guide surface 28. The static pressure portion R is thus surrounded and sealed by the seal member 3.

In the first exemplary embodiment, a thickness of the pressure-lowering portion L, i.e., a thickness of a gap between the pressure-lowering portion L and the guide surface 28, is significantly small (approximately several ten microns) as compared with those of the outer groove 21 and the inner groove 22.

Oil Supply Structure 4

As shown in FIG. 3, the oil supply structure 4 includes: an oil filler unit 44 and a hydraulic control valve 43, the oil filler unit 44 including the oil supply passage 40 leading to the hydrostatic pressure guide mechanism 1, an oil tank 41 configured to store the static pressure oil O, and an oil supply device 42 configured to supply the static pressure oil O to the hydrostatic pressure guide mechanism 1, the hydraulic control valve 43 being located in the oil supply passage 40. The static pressure oil O pressurized by the oil supply device 42 is supplied to the static pressure portion R (recess) through the oil supply passage 40.

The oil supply device 42 may include a hydraulic pump 421. The hydraulic pump 421 of the oil supply device 42 is equipped with the motor 422 whose rotation speed is controllable.

The oil supply device 42 is thus configured to increase the rotation speed of the motor 422 to increase the pressure of the static pressure oil O in the static pressure portion R (recess). The applied load can be supported with a lift generated by an increased supply pressure. However, when the lift becomes large over the applied load, the movement member 2 is lifted to form a gap between the static pressure surface 26 and the guide surface 28.

In contrast, the supply pressure of the static pressure oil O of the static pressure portion R (recess) can be reduced by reducing the rotation speed of the motor 422.

The hydraulic control valve 43 is configured to adjust the flow rate of the static pressure oil O passing through the oil supply passage 40. Accordingly, the hydraulic control valve 43 may also be used to control the flow rate of the static pressure oil O in the static pressure portion R and, consequently, control the pressure of the static pressure oil O, which is in a constant proportional relationship with the flow rate. Incidentally, the hydraulic control valve 43 may be a proportional control valve or a throttle valve.

Oil Recovery Structure 5

As shown in FIG. 3, the oil recovery structure 5 is provided in the hydrostatic pressure guide mechanism 1 and has the recovery hole 50 through which the static pressure oil O flows out of the static pressure surface 26, as described above. The oil recovery structure 5 also has a recovery passage 51 communicating with the recovery hole 50.

The recovery passage 51 is formed in the movement member 2 and has a first opening communicating with the recovery hole 50 and a second opening communicating with the oil tank 41 of the oil supply structure 4. The oil recovery structure 5 can thus return the static pressure oil O having been supplied to the hydrostatic pressure guide mechanism 1 to the oil tank 41.

Function of Hydrostatic Pressure Guide Mechanism 1

As shown in FIG. 5, in the hydrostatic pressure guide mechanism 1, the pressurized static pressure oil O enters the static pressure portion R defined between the outer groove 21 and the inner groove 22 through the oil supply passage 40. At this time, the hydrostatic pressure of the static pressure oil O present between the outer groove 21 and the inner groove 22, which communicate with each other through the communication groove 30, becomes the same as a supply pressure Ps. The static pressure portion R thus provides a constant pressure area.

After flowing through the static pressure portion R, the static pressure oil O flows through the pressure-lowering portion L and is recovered through the recovery hole 50. Since a pressure in the recovery hole 50 is substantially the same as the atmospheric pressure, a discharge pressure Pe of the static pressure oil O is released. The hydrostatic pressure of the static pressure oil O in the pressure-lowering portion L thus drops toward a center along a radius r of a circular area surrounded by the seal member 3, and is released substantially to the atmospheric pressure at a position corresponding to the recovery hole 50.

The pressure-lowering portion L formed on the inside relative to the inner groove 22 thus functions as a pressure-drop portion for the static pressure oil O, so that a static pressure for supporting an applied load is ensured in the static pressure portion R with a pressure receiving area defined between the outer groove 21 and the inner groove 22. In other words, the static pressure portion R functions as a static pressure chamber for supporting an applied load.

The static pressure oil O having been supplied to the hydrostatic pressure guide mechanism 1 is eventually all recovered through the recovery hole 50. Further, since the static pressure portion R is surrounded and sealed by the seal member 3, the static pressure oil O is prevented from leaking outside.

Control System 140

As shown in FIGS. 6 and 7, in the first exemplary embodiment, the control system 140 includes a hydraulic pressure adjusting unit for adjusting the hydrostatic pressure of the static pressure oil O supplied to the hydrostatic pressure guide mechanism 1 in each guide mechanism 130.

Incidentally, the control system 140 of the first exemplary embodiment is configured to control the components of the machine tool 110 in general and has a variety of functions as described above, but description will be made on a part relevant to the guide mechanism 130 of each of the axis movement mechanisms 121 to 123.

As shown in FIGS. 6 and 7, the control system 140 includes: a console 141 including an operation unit 1411 and a display 1412; and a hydraulic pressure adjuster 70 configured to adjust a hydrostatic pressure for each of the axis movement mechanisms 121 to 123.

The operation unit 1411 includes input devices such as a touch panel, a keyboard, a button and/or other pointing device(s), and may be used by an operator of the machine tool 110 to input a command or the like.

The display 1412, which may be a display screen such as a graphic display, is configured to display not only operation contents inputted with the operation unit 1411 but also an operation state and/or a measurement result of the machine tool 110.

Hydraulic Pressure Adjuster 70

As shown in FIGS. 6 and 7, the hydraulic pressure adjuster 70 includes an NC-main controller 142 and a PC-sequence controller 143. The NC-main controller 142 and the PC-sequence controller 143 are basic components of the control system 140 of the machine tool 110.

However, in the first exemplary embodiment, these controllers are intended to serve as the hydraulic pressure adjuster 70, which adds the control system 140 with a function of adjusting the hydrostatic pressure of the static pressure oil O supplied to the hydrostatic pressure guide mechanism 1 in the guide mechanism 130 for each of the axis movement mechanisms 121 to 123 that are to be controlled by the control system 140.

The NC-main controller 142 includes a program controller 144 and a motor controller 145.

The program controller 144 is configured to analyze an externally loaded operation program (M code) and control each part of the NC-main controller 142.

The motor controller 145 is configured to control, under the control of the program controller 144, the axis motors 211 to 231 of the driving mechanism 150 of the machine tool 110 and the motor 422 of the oil supply device 42.

The PC-sequence controller 143 includes a sequence program controller 146, an operation command unit 147 and an input/output controller 148.

The sequence program controller 146 is configured to analyze an externally loaded operation program (M code) and control each part of the PC-sequence controller 143.

The operation command unit 147 is configured to output a manual command to the sequence program controller 146, the input/output controller 148 and the NC-main controller 142 and change the setting of these controllers in response to an external operation from the console 141.

The input/output controller 148 is configured to process, under the control of the sequence program controller 146, an output signal from a sensor 101 provided to the machine tool 110 (e.g., a torque sensor and an acceleration sensor provided to the parts of the machine tool 110).

As shown in FIGS. 6 and 7, the hydraulic pressure adjuster 70 includes components for adding the function of adjusting the hydrostatic pressure of the static pressure oil O supplied to the hydrostatic pressure guide mechanism 1, such as a pressure setting unit 71, a constant acceleration motion controller 72, a workpiece-weight calculator 73 and a supply state adjuster 74. These components belong to the sequence program controller 146. These components are configured to estimate a weight W of the workpiece 119 from a detection value of the sensor 101 and output a command for adjusting the hydrostatic pressure of the static pressure oil O supplied to the hydrostatic pressure guide mechanism 1 in accordance with the estimation result.

Further, the sequence program controller 146 also includes a data storage 75 configured to store data that is to be referenced when the workpiece-weight calculator 73 calculates the weight W of the workpiece 119, and judgment data H that is to be referenced when the supply state adjuster 74 generates a command.

Hydrostatic Pressure Adjustment Process

Figure 8:
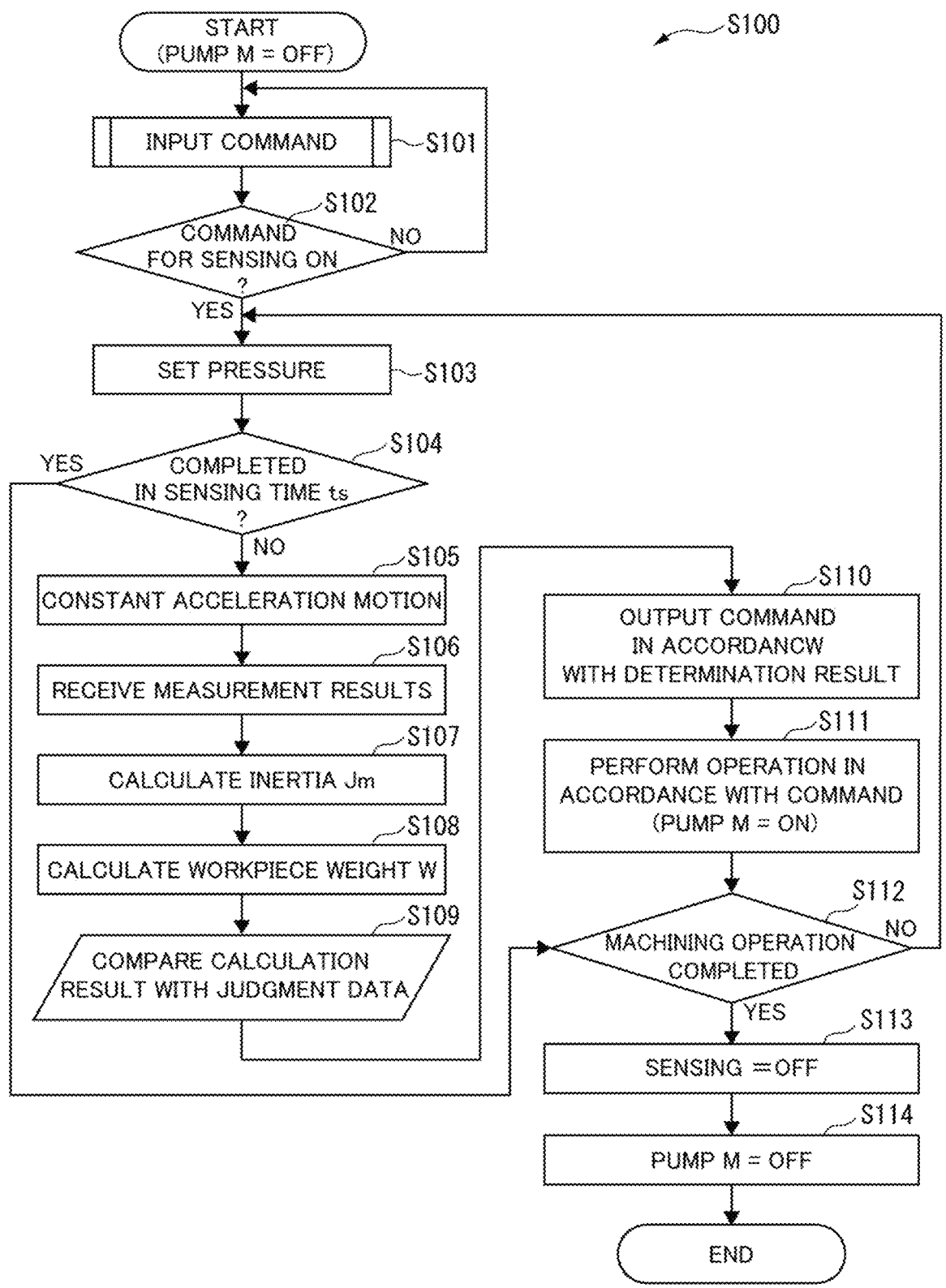
FIG. 8 is a flow chart showing hydraulic pressure adjustment according to the first exemplary embodiment.

As shown in FIG. 8, the hydrostatic pressure of the static pressure oil O supplied to the hydrostatic pressure guide mechanism 1 can be adjusted by a hydrostatic pressure adjustment process.

In the first exemplary embodiment, when machining of the workpiece 119 with the tool 118 is not in progress (e.g., a cutting feed operation or a fast-forward operation is performed) during the execution of a machining program of the machine tool 110, the hydrostatic pressure is adjusted by sensing the motion of each of the axis movement mechanisms 121 to 123 and calculating the weight W of the workpiece 119.

As shown in FIG. 8, in Step S100 of the hydrostatic pressure adjustment process, the hydraulic pressure adjuster 70 initially waits for a command for turning the sensing on to be inputted (Step S101).

The pressure setting unit 71, in response to the input of the command for turning the sensing on (Step S102), adjusts the supply pressure of the static pressure oil O applied to the hydrostatic pressure guide mechanism 1 to a predetermined pressure (Step S103).

Specifically, prior to such pressure setting, the supply pressure of the static pressure oil O is set at a specific value, an inertia mass obtained when each of a plurality of workpieces with known weights is moved at a constant acceleration by the X-axis movement mechanism 121 is measured as an inertia, and the measured inertia obtained from the measurement result and a nominal inertia derived from corresponding one of the workpiece weights are plotted. Such a process from setting the supply pressure of the static pressure oil O to plotting the measured inertia and the nominal inertia is performed upon setting each of a plurality of different supply pressures, and the supply pressure resulting in the smallest and non-excess deviation between the plotted inertias is selected as the predetermined pressure for the workpiece 119.

After the pressure setting unit 71 adjusts the pressure of the static pressure oil O to the predetermined pressure, the constant acceleration motion controller 72 starts a constant acceleration motion of the table 112 and the workpiece 119 with respect to the platform 111 (i.e., the cutting feed operation or the fast-forward operation at the time when the machining is not in progress) while the motion is sensed by the sensor 101.

Since a certain duration of time is required before the constant acceleration motion becomes stable, a sensing waiting time is to elapse before the sensor 101 performs the sensing has been stored in the data storage 75. In other words, the sensor 101 performs the sensing after the elapse of the sensing waiting time ts since the constant acceleration motion controller 72 starts the constant acceleration motion.

Incidentally, the constant acceleration motion controller 72 causes the constant acceleration motion in a form of the cutting feed operation or the fast-forward operation when machining is not in progress, and thus a displacement of the workpiece 119 resulting from the constant acceleration motion depends on a machining operation of the machine tool 110. In other words, the workpiece 119 is to be displaced by an amount corresponding to an amount of the cutting feed operation or the fast-forward operation required for the machining operation, and such a displacement is sometimes completed before the elapse of the sensing waiting time ts. Accordingly, before starting the constant acceleration motion, the constant acceleration motion controller 72 determines from setting details for the machining operation (e.g., a fast-forward speed, an acceleration time and a necessary displacement) whether or not the displacement resulting from the cutting feed operation or the fast-forward operation will be completed in the sensing waiting time ts (S104). If it is determined that the displacement will be completed, the process proceeds to later-described Step S112. If it is determined that the displacement will not be completed, the constant acceleration motion is started and the sensor 101 performs the sensing (S105).

Results of the sensing by the sensor 101, such as a drive current value I and a torque T of the X-axis motor 211 and an acceleration Ar of the workpiece 119, are sent to the workpiece-weight calculator 73 via the input/output controller 148 (Step S106).

The workpiece-weight calculator 73 calculates an inertia Jm by a relational expression of $Jm = I \cdot Kt/Ar$ from the received drive current value I and acceleration Ar, and a torque coefficient Kt of the X-axis motor 211 having been stored in the data storage 75 (Step S107).

Incidentally, the torque T is a value including a viscosity resistance and a slide resistance of the workpiece 119 relative to the platform 111. Thus, the calculated inertia Jm is not an exclusive inertia mass of the workpiece 119 but a value inclusive of the viscosity resistance and the slide resistance. The viscosity resistance and the slide resistance inevitably change due to the operating environment and/or the secular change of the machine tool 110, which makes accurate estimation of the inertia Jm difficult.

Accordingly, in order to measure the torque T, a torque value at the time of acceleration and a torque value at the time of deceleration are preferably averaged. This allows for offsetting viscosity resistance and slide resistance at the time of acceleration and viscosity resistance and slide resistance at the time of deceleration, so that a torque value spent by the acceleration and deceleration of the workpiece 119 can be exclusively obtained as the torque T. The inertia Jm can thus be accurately estimated as an exclusive inertia mass of the workpiece 119.

Next, the workpiece-weight calculator 73 calculates the weight W of the workpiece 119 by a relational expression of $W=(2\pi/S\cdot Ar)\cdot(T-(2\pi\cdot Ar\cdot Jm/S))$ from the calculated inertia Jm, the received torque T and acceleration Ar, and an axial displacement S per rotation of a rotary shaft of the X-axis movement mechanism 121 having been stored in the data storage 75 (Step S108).

The supply state adjuster 74 compares the weight W calculated by the workpiece-weight calculator 73 with the judgment data H having been stored in the data storage 75 (Step S109), and outputs a command based on the judgment result to the motor controller 145 (Step S110).

The motor controller 145 controls the operation of the motor 422 of the oil supply device 42 in accordance with the outputted command (Step S111). Specifically, the motor controller 145 adjusts static pressure oil O by switching on/off of the motor 422, switching stepwise the rotation speed of the motor 422 from the maximum speed to a stopped state, or continuously switching the rotation speed of the motor 422 from the maximum speed to the stopped state.

Further, the motor controller 145 adjusts the speed or acceleration of the cutting feed operation or the fast-forward operation of each of the axis movement mechanisms 121 to 123 by controlling the operation of each of the motors 211 to 231 in accordance with the outputted command.

The setting of the driving mechanism 150 for the machining operation can thus be suitably adjusted depending on the weight of the workpiece 119.

The hydraulic pressure adjuster 70 repeats above Steps S103 to S111 until the machining operation is completed in Step S112.

When the completion of the machining operation is determined in Step S112, the sensing operation is turned off (Step S112), and the motor 422 of the oil supply device 42 is turned off (Step S113).

In the above hydrostatic pressure adjustment process, the sensing is performed during the cutting feed operation or the fast-forward operation when the machining is not in progress in Steps S103 to S111, and the obtained measurement results are used to automatically adjust the hydrostatic pressure.

In other words, such an automatic adjustment by sensing is always performed while the workpiece is repeatedly displaced to be machined by the machine tool 110. Such an operation is repeated to adjust the hydrostatic pressure depending on the state at each point in the process of displacement.

Further, as long as a command for turning the sensing on has been set in the machining program for the machine tool 110, the hydrostatic pressure can be automatically adjusted at a timing indicated by the machining program. The hydrostatic pressure can thus be kept suitably adjusted irrespective of a change in the weight W of the workpiece 119.

Advantages of First Exemplary Embodiment

The above exemplary embodiment provides the following advantages.

In the first exemplary embodiment, even when the weight of the workpiece 119 is unknown, the weight W of the workpiece 119 is estimated, and the hydrostatic pressure of the static pressure oil O can be suitably adjusted depending on the estimated weight W.

Further, as long as the machining program of the machine tool 110 contains a weight-estimation process, the hydrostatic pressure can be automatically adjusted at a timing specified by the machining program. The hydrostatic pressure can thus be kept suitably adjusted irrespective of a change in the weight W of the workpiece 119 with the progress of machining.

Further, the operation of each of the axis motors 211 to 231 is controlled in accordance with the command outputted from the supply state adjuster 74, thereby suitably adjusting the setting of the driving mechanism 150 for the machining operation depending on the weight W of the workpiece 119.

In the first exemplary embodiment, the sensing is performed on the axis movement mechanisms 121 to 123 when the machining with machine tool 110 is not in progress and the cutting feed operation or the fast-forward operation is performed. The axis movement mechanisms 121 to 123 are thus not required to perform any dedicated operation for weight estimation, which results in an improved work efficiency.

In the first exemplary embodiment, prior to the pressure setting at the time of the sensing by the sensor 101, the supply pressure of the static pressure oil O is set at a specific value, an inertia mass obtained when a plurality of workpieces with known weights are each moved at a constant acceleration by the X-axis movement mechanism 121 is measured as an inertia, and a measured inertia obtained from the measurement result and a nominal inertia derived from each of the workpiece weights are plotted. Such a process from setting the supply pressure of the static pressure oil O to plotting the measured inertia and the nominal inertia is performed upon setting each of a plurality of different supply pressures, and the supply pressure resulting in the smallest and non-excess deviation between the plotted inertias is selected as the predetermined pressure. The pressure can thus be suitably set, improving the accuracy of weight estimation. This results in suitable adjustment of the hydrostatic pressure in the hydrostatic pressure guide mechanism 1.

Further, in the first exemplary embodiment, the hydraulic pressure adjuster 70 of the control system 140 adjusts the supply pressure of the static pressure oil O supplied to the static pressure portion R depending on the weight W of the workpiece 119, thereby enhancing/lowering a load supporting performance of the hydrostatic pressure guide mechanism 1.

For instance, when the workpiece 119 applies a large load, the pressure of the static pressure oil O supplied to the static pressure portion R is increased to preferentially ensure that the hydrostatic pressure guide mechanism 1 can receive a high load.

In contrast, when the workpiece 119 applies a small load, the static pressure oil O supplied to the static pressure portion R is reduced to allow the sliding guide mechanism 10 to be more effective than the hydrostatic pressure guide mechanism 1.

The hydraulic pressure adjuster 70 of the first exemplary embodiment can thus adjust a balance between a load applied on the hydrostatic pressure guide mechanism 1 and a load applied on the sliding guide mechanism 10 depending on the weight W of workpiece 119, varying the performance of the guide mechanism 130 depending on the workpiece weight.

Second Exemplary Embodiment

Figure 9:
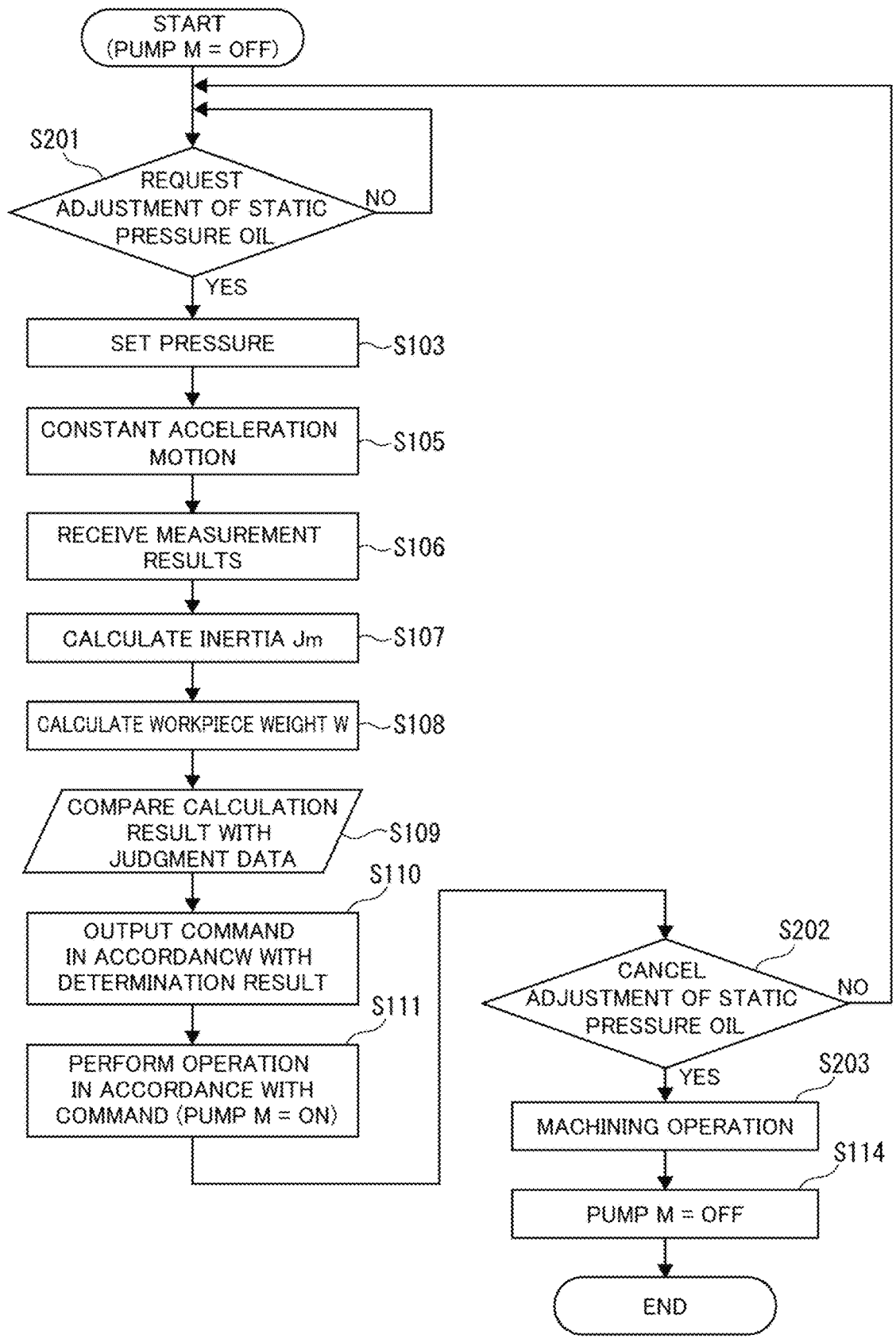
FIG. 9 is a flow chart showing hydraulic pressure adjustment according to a second exemplary embodiment of the invention.

FIG. 9 is a flowchart according to a second exemplary embodiment of the invention.

In the second exemplary embodiment, the respective basic structures of the machine tool 110, the control system 140 including the hydraulic pressure adjuster 70, the guide mechanisms 130, the hydrostatic pressure guide mechanism 1 and the sliding guide mechanism 10 are the same. Hence, a duplicated description is omitted and a different structure(s) will be described below.

In the first exemplary embodiment, when machining of the workpiece 119 with the tool 118 is not in progress (i.e., the cutting feed operation or the fast-forward operation is performed) during the execution of the machining program of the machine tool 110, the hydrostatic pressure is adjusted by sensing the motion of each of the axis movement mechanisms 121 to 123 and calculating the weight W of the workpiece 119 (see FIG. 8).

In the second exemplary embodiment, prior to the execution of the machining program, the measurement of the weight W of the workpiece 119 is performed by an independent dedicated program.

Hydrostatic Pressure Adjustment

As shown in FIG. 9, the hydraulic pressure adjuster 70 performs Step S201 in place of Steps S101, S102 of the first exemplary embodiment (see FIG. 8).

In Step S201, the hydraulic pressure adjuster 70 waits for the input of a command for adjusting the static pressure oil.

Upon the input of the command for adjusting the static pressure oil, the pressure setting unit 71 adjusts the supply pressure of the static pressure oil O supplied to the hydrostatic pressure guide mechanism 1 to the predetermined pressure as in Step S103 of the first exemplary embodiment, and then performs Step S105 to Step S111 of the first exemplary embodiment. In other words, Step S104 of the first exemplary embodiment is skipped.

Further, Steps S112, S113 of the first exemplary embodiment (see FIG. 8) are replaced with Steps S202, S203.

In Step S202, it is determined whether or not the adjustment of the static pressure oil is cancelled. When the adjustment of the static pressure oil is determined to be cancelled in Step S202, the machining operation is performed in accordance with the machining program in Step S203. Subsequently, when the machining operation is completed, the motor 422 of the oil supply device 42 is turned off (Step S113).

Advantages of Second Exemplary Embodiment

In the second exemplary embodiment, the respective basic structures of the machine tool 110, the control system 140 including the hydraulic pressure adjuster 70, the guide mechanism 130, the hydrostatic pressure guide mechanism 1 and the sliding guide mechanism 10 are the same as those in the first exemplary embodiment, and thus the same advantages of these components can be obtained.

Further, the second exemplary embodiment uses the independent dedicated program to adjust the hydrostatic pressure depending on the weight W of the workpiece 119 prior to execution of the machining program, thereby simplifying the machining operation in the machining program. A faster machining operation can thus be achieved.

Other Exemplary Embodiment

It should be understood that the scope of the invention is not limited to the above-described exemplary embodiments but includes modifications and improvements compatible with an object of the invention.

The hydrostatic pressure guide mechanism 1 according to the above exemplary embodiments employs a circular hydrostatic structure in which the static pressure oil O is supplied through the oil supply passage 40 to the static pressure portion R, the static pressure oil O discharged from the static pressure portion R is recovered through the recovery passage 51, and the recovered oil is returned to the oil tank 41. However, the structure of the hydrostatic pressure guide mechanism 1 is not limited to such a circular hydrostatic structure, but may be a simple one-way hydrostatic structure. For instance, instead of being recovered through the recovery passage 51 and returned to the tank 61, the static pressure oil O may be supplied through the oil supply passage 40 to the static pressure portion R to generate static pressure in the static pressure portion R and, subsequently, be simply recovered through the recovery passage 51 to the oil tank 41.

Further, the structure of the hydrostatic pressure guide mechanism 1 may be an oil-filled hydrostatic structure in which the static pressure of the static pressure oil O stored in the static pressure portion R is used. Even in such an arrangement, the oil supply passage 40 needs to be provided in order to maintain each of the amount and the pressure of the static pressure oil O in the static pressure portion R at a predetermine value, but the recovery passage 51 may be omitted.

The hydraulic pressure adjuster 70 according to the above exemplary embodiments outputs a command for adjusting the static pressure oil O in response to a detection value of the sensor. Additionally, a command for adjusting the static pressure oil O may be outputted by, for instance, a manual operation or a program.

Further, the hydraulic pressure adjuster 70 is added to the control system 140 to provide the hydraulic pressure adjusting device, but an independent hydraulic pressure adjusting device may be externally connected to the control system 140 or, alternatively, the hydrostatic pressure of the static pressure oil O in each of the guide mechanisms 130 may be adjusted not via the control system 140.

Figure 10:
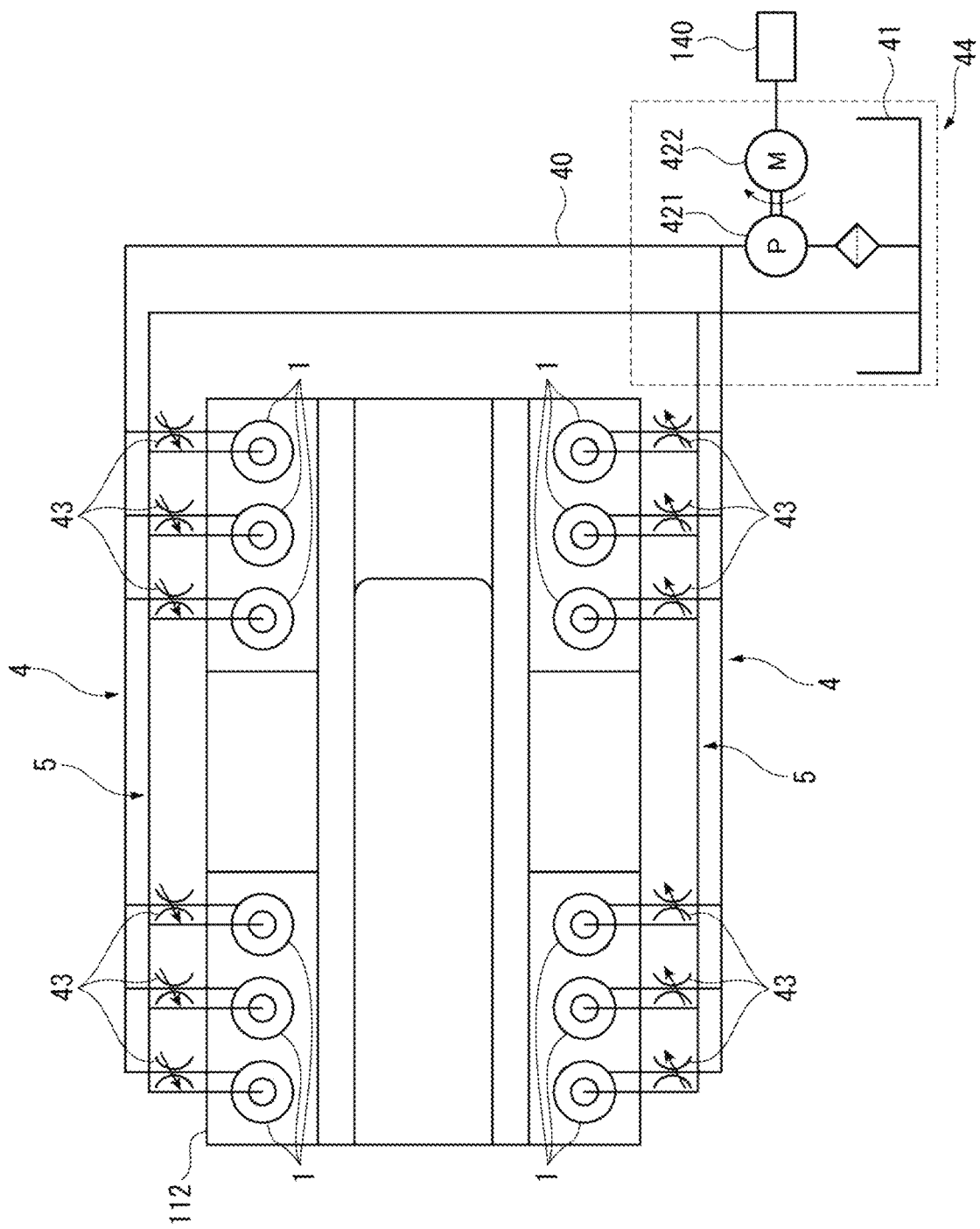
FIG. 10 is a schematic view showing an oil supply structure and an oil recovery structure according to another exemplary embodiment of the invention.

In the above exemplary embodiment, the operation of the motor 422 of the oil supply device 42 is controlled to adjust the hydrostatic pressure of the static pressure oil O. However, instead of the above arrangement, the hydraulic control valve 43 located in the oil supply passage 40 may be a proportional control valve as shown in FIG. 10, and an opening position of the hydraulic control valve 43 may be continuously changed in proportion to a voltage of an inputted signal (e.g., 1 V to 5 V) to adjust the hydrostatic pressure of the static pressure oil O.

In the second exemplary embodiment, the operations for the hydraulic pressure adjustment (Steps S103 to S111) are performed in series and then the machining operation (Step S203) is performed (see FIG. 9). However, after the operations for the hydraulic pressure adjustment (Steps S103 to S111) are performed, the machine tool 110 may be on standby for the next operation instead of performing the machining operation (Step S203).

The invention is applicable to a variety of machine tools having two relatively movable members different from the machine tool 110.

Further, the guide mechanism(s) 130 may be used not only as a guide mechanism for linear movement but also as a guide mechanism provided to a rotary portion (e.g., a rotary support mechanism of a rotary table). In the latter case, prior to setting the pressure of the static pressure oil O, an inertia moment is measured as an inertia. In other words, the inertia according to the exemplary embodiments means inertia mass or inertia moment.

What is claimed is:

1. A machine tool comprising:
   a guide member;
   a movement member configured to move with respect to the guide member;
   a driving mechanism configured to move the movement member;
   a hydrostatic pressure guide mechanism provided between a guide surface of the guide member and a smooth surface of the movement member; and
   a control system configured to control a supply state of a static pressure oil supplied to the hydrostatic pressure guide mechanism, the control system comprising:
   a setting unit configured to set a supply pressure of the static pressure oil supplied to the hydrostatic pressure guide mechanism at a predetermined pressure;
   a constant acceleration motion unit configured to cause a constant acceleration motion of the movement member, on which a workpiece is placed, with respect to the guide member by the driving mechanism;
   a workpiece-weight estimation unit configured to estimate a weight of the workpiece from an operation state of the driving mechanism during the constant acceleration motion; and
   a supply state adjusting unit configured to adjust the supply state of the static pressure oil controlled by the control system depending on the weight of the workpiece estimated by the workpiece-weight estimation unit.

2. The machine tool according to claim 1, wherein the constant acceleration motion of the movement member caused by the constant acceleration motion unit comprises a cutting feed operation or a fast-forward operation performed when machining of the machine tool is not in progress.

3. The machine tool according to claim 1, wherein the control system further comprises a supply pressure setting unit configured to determine the predetermined pressure, before the setting unit sets the supply pressure of the static pressure oil at the predetermined pressure, by:
   setting the supply pressure of the static pressure oil at a specific value;
   measuring an inertia mass or an inertia moment obtained when each of a plurality of workpieces having known weights is moved at a constant acceleration;
   plotting a measured inertia mass or a measured inertia moment obtained from a measurement result and a nominal inertia mass or a nominal inertia moment derived from the weight of the each of the workpieces;
   performing a process from the setting of the supply pressure of the static pressure oil to the plotting upon setting each of a plurality of different supply pressures; and
   selecting, as the predetermined pressure, one of the supply pressures resulting in the smallest and non-excessive deviation between the plotted measured inertia mass or measured inertia and the plotted nominal inertia mass or nominal inertia moment.

4. The machine tool according to claim 1, further comprising a sliding guide mechanism provided between the guide surface of the guide member and the smooth surface of the movement member, the sliding guide mechanism providing a hydrostatic-pressure combined sliding guide mechanism in combination with the hydrostatic pressure guide mechanism.

5. The machine tool according to claim 1, wherein
   the hydrostatic pressure guide mechanism comprises:
   a closed static pressure chamber that is sealed around an outer periphery thereof;
   a supply passage through which the static pressure oil is supplied to the static pressure chamber; and
   a recovery passage through which the static pressure oil is recovered from the static pressure chamber, and
   the hydrostatic pressure guide mechanism is connected to a hydraulic pressure adjusting device configured to adjust the static pressure oil supplied to the static pressure chamber.

6. A control method of a machine tool, the machine tool comprising:
   a guide member;
   a movement member configured to move with respect to the guide member;
   a driving mechanism configured to move the movement member;
   a hydrostatic pressure guide mechanism provided between a guide surface of the guide member and a smooth surface of the movement member; and
   a control system configured to control a supply state of a static pressure oil supplied to the hydrostatic pressure guide mechanism, the method comprising:
   placing a workpiece on the movement member;
   setting a supply pressure of the static pressure oil supplied to the hydrostatic pressure guide mechanism at a predetermined pressure;
   causing a constant acceleration motion of the movement member, on which a workpiece is placed, with respect to the guide member by the driving mechanism;
   estimating a weight of the workpiece from an operation state of the driving mechanism during the constant acceleration motion; and
   adjusting the supply state of the static pressure oil controlled by the control system depending on the estimated weight of the workpiece.

* * * * *